March 6, 1934. G. RAYMOND 1,950,191
FLOAT
Filed Jan. 11, 1932
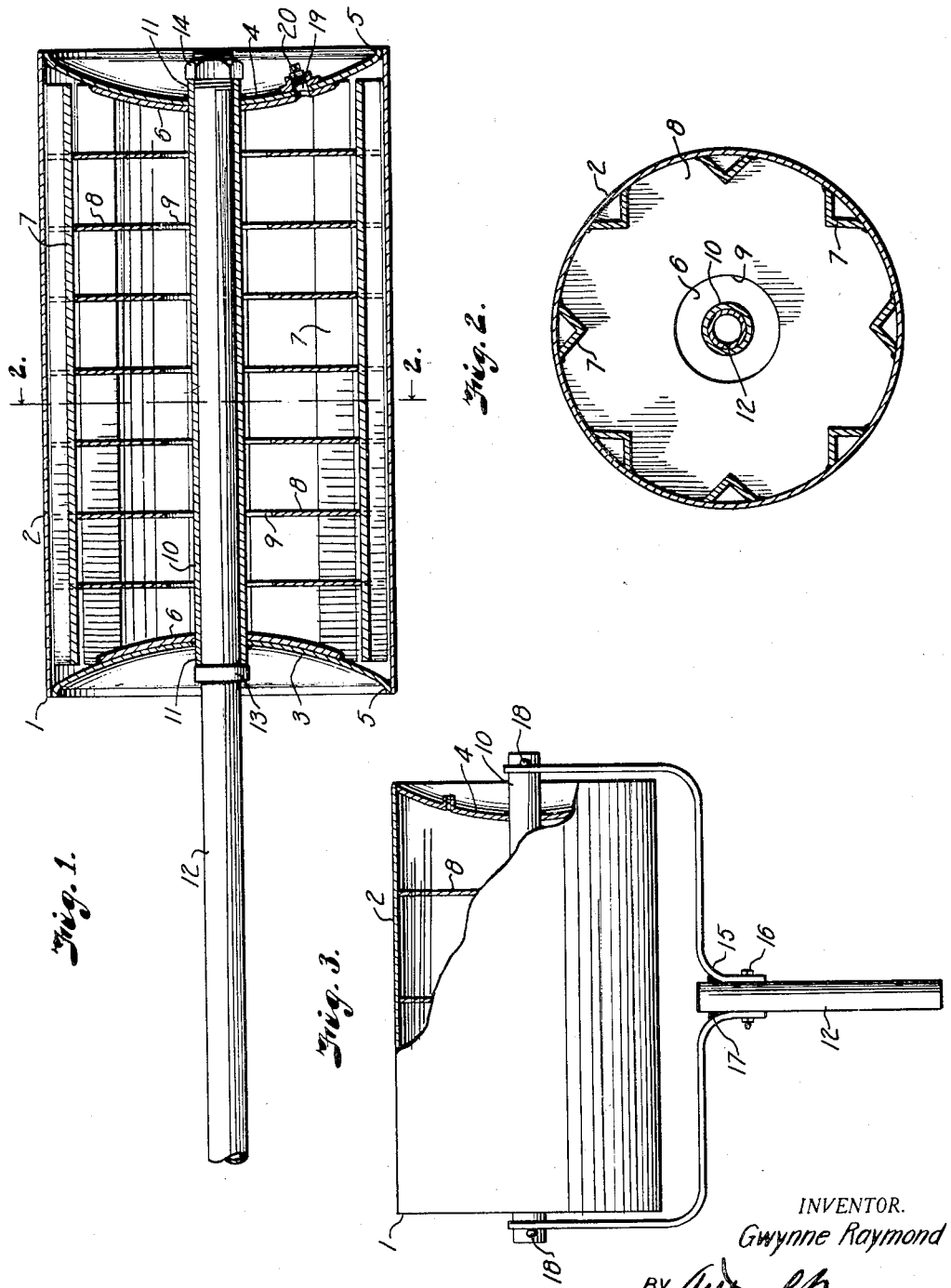
INVENTOR.
Gwynne Raymond
BY 
ATTORNEY.

Patented Mar. 6, 1934

1,950,191

UNITED STATES PATENT OFFICE 1,950,191

FLOAT

Gwynne Raymond, Kansas City, Mo.

Application January 11, 1932, Serial No. 585,908

4 Claims. (Cl. 137—104)

My invention relates to floats and more particularly to a device of that character for controlling liquid level in vessels subjected to high internal pressures, such as traps for the separation of oil and gas delivered from oil wells under flush flow.

A float of the character described, to be effective for actuating the outlet valve of a trap or separator subjected to high internal pressures, must have a substantial displacement volume and be of considerable weight to provide torque for operating the valve, but must be of sturdy construction to withstand external pressures imposed upon it by contents of the vessel and avoid shearing or bending of its connecting rod.

It is, therefore, the objects of my invention to provide a float having the buoyancy and weight required for operating a valve under the conditions above stated but of sufficient strength to withstand the torque and pressure stresses incident to such conditions.

In accomplishing these objects, I have provided improved details of structure, the preferred form of which is illustrating in the accompanying drawing, wherein:

Fig. 1 is a central longitudinal section of a float constructed according to my invention, illustrating one form of valve rod connection.

Fig. 2 is a cross section of the float on the line 2—2, Fig. 1.

Fig. 3 is a plan view of a modified form of the float and valve rod connection.

Referring more in detail to the drawing:—

1 designates a float body consisting of a metal cylinder 2 and heads 3—4, the latter having flanges 5 sealed to the cylinder by welding, or otherwise, to form a structure capable of excluding liquid from the interior of the body under high external pressure, the heads being preferably dished inwardly and reinforced by stiffening plates 6.

Fixed to the inner wall of the cylinder, by welding or otherwise, are spaced, longitudinal stiffening ribs 7 and spaced, transverse diaphragms 8 to support the wall against tensional and compressional strains and stresses, the latter notched to fit over the ribs 7 and provided with central openings 9, thus bracing the body and providing space for a valve rod mounting.

Extending through the reinforced heads 3—4 and through the central openings 9 in the diaphragms is a tube 10, sealed to the heads by welding or otherwise and extending slightly outwardly from the heads to provide stud-like portions 11 for mounting of a valve rod 12 thereon.

When the float is to extend longitudinally with the valve rod, the rod is provided with a collar 13 at a distance from its float end to engage one end of the tube 10 when the free end of the rod is projected slightly from the opposite end of the tube, and the free end of the rod threaded to receive a nut 14 adapted to engage said opposite end of the tube to clamp the rod on the tube, thus rigidly attaching the rod to the float without exposing the interior of the float to inlet of liquid from its exterior and avoiding the shearing or bending strains that would be incident to attachment of the rod to but one end of the float.

The modified form of float, illustrated in Fig. 3, corresponds with that of Figs. 1 and 2 except for omission of the stiffening head plates, the longitudinal stiffening ribs, the number of transverse diaphragms, and the mounting of the valve rod.

In the form shown in Fig. 3, the end of the tube 10 is extended further from the end of the float than in the form shown in Fig. 1, to project beyond the plane of the float and provide space for pivotal mounting thereon of one arm of a yoke 15 on the valve rod 12, the other arm of the yoke being pivotally mounted on the rod adjacent the other end of the float. Both yoke arms are secured to the valve rod by a bolt 16 and preferably by welding the attaching ends of the yoke arms to the face of the rod, as at 17, keepers, such as cotter pins 18, on the rod retaining the yoke arms on the rod without interfering with pivotal mounting of the arms.

In each form one end of the float is provided with an opening 19 through which the float may be filled with air to help sustain the walls of the float against the external pressures or for testing, or through which the float may be drained of any liquid that may leak thereinto, but which is normally closed by a plug 20.

A float embodying my invention when located in a separator or like vessel and connected with the outlet valve thereof will withstand the high pressures in the vessel and operate the valve uniformly in response to changing levels of liquid in the vessel, is easily assembled with the valve rod, and subject to replacements of damaged parts with minimum loss.

What I claim and desire to secure by Letters Patent is:

1. A float of the character described including a liquid-tight hollow body, diaphragms extending transversely through said body and secured to the wall thereof, and a member extending through said diaphragms and connected with said wall to cooperate with said diaphragms in supporting the wall against compression stresses.

2. A float of the character described including a cylindrical wall and end walls sealingly connected to the cylindrical wall to form a hollow body, rib members extending longitudinally of the inner face of the cylindrical wall as spaced points about its inner periphery to support said cylindrical wall against compressional stresses produced by external forces acting in a longitudinal direction, and a diaphragm having its periphery welded to the cylindrical wall and to the longitudinal ribs for cooperating with the end walls for supporting the cylindrical wall against circumferential compressional stresses.

3. A float of the character described including a cylindrical wall and end walls sealingly connected with the cylindrical walls to form a hollow body, rib members extending longitudinally of the inner face of the cylindrical wall at spaced points about its inner periphery to support said cylindrical wall against compression stresses produced by external forces acting towards the ends of said body, a diaphragm having its periphery welded to the cylindrical wall and to the longitudinal members for cooperating with the end walls in supporting the cylindrical wall against circumferential compressional stresses and provided with an axial opening, a tubular member sealed to the end walls and extending axially through the body and through said opening and having its ends projecting through the end walls, a float stem, and means for anchoring the float stem to the ends of the tubular member at points spaced from said sealed connections with the end walls.

4. A float of the character described including a cylindrical wall and end walls sealingly connected to the cylindrical wall to form a hollow body, angle bars extending longitudinally of the inner face of the cylindrical wall at spaced points about its inner periphery with the angles of the bars directed inwardly to support said cylindrical wall against longitudinal compression stresses produced by external forces, and spaced diaphragms extending transversely within the hollow body and having notches to accommodate the angles of the bars, the peripheries of said diaphragms being welded to the angle members and to the cylindrical wall.

GWYNNE RAYMOND.